US008238718B2

(12) United States Patent
Toyama et al.

(10) Patent No.: US 8,238,718 B2
(45) Date of Patent: Aug. 7, 2012

(54) SYSTEM AND METHOD FOR AUTOMATICALLY GENERATING VIDEO CLIPLETS FROM DIGITAL VIDEO

(75) Inventors: Kentaro Toyama, Redmond, WA (US); Nebojsa Jojic, Redmond, WA (US); Jaco Vermaak, Cambridge (GB)

(73) Assignee: Microsoft Corporaton, Redmond, WA (US)

( * ) Notice: Subject to any disclaimer, the term of this patent is extended or adjusted under 35 U.S.C. 154(b) by 2430 days.

(21) Appl. No.: 10/176,828

(22) Filed: Jun. 19, 2002

(65) Prior Publication Data

US 2003/0234803 A1 Dec. 25, 2003

(51) Int. Cl.
*H04N 5/93* (2006.01)
*H04N 9/80* (2006.01)

(52) U.S. Cl. .................. 386/278; 386/241; 386/243

(58) Field of Classification Search .................. None
See application file for complete search history.

(56) References Cited

U.S. PATENT DOCUMENTS

| | | | |
|---|---|---|---|
| 6,377,519 B1 | 4/2002 | Lee et al. | |
| 6,393,054 B1 * | 5/2002 | Altunbasak et al. | 375/240 |
| 6,606,409 B2 * | 8/2003 | Warnick et al. | 382/173 |
| 6,711,290 B2 * | 3/2004 | Sparr et al. | 382/186 |
| 6,785,419 B1 * | 8/2004 | Jojic et al. | 382/197 |
| 7,046,731 B2 * | 5/2006 | Wu et al. | 375/240.16 |
| 7,246,314 B2 * | 7/2007 | Foote et al. | 715/700 |
| 2001/0005430 A1 * | 6/2001 | Warnick et al. | 382/173 |
| 2002/0054083 A1 | 5/2002 | Boreczky et al. | |

FOREIGN PATENT DOCUMENTS

| | | |
|---|---|---|
| JP | 06-223179 | 8/1994 |
| JP | 08-292965 | 11/1996 |

OTHER PUBLICATIONS

A. Girgensohn, S. Bly, F. Shipman, J. Boreczky and L. Wilcox, Home Video Editing Made Easy—Balancing Automation and User Control, In Human-Computer Interaction INTERACT '01, IOS Press, pp. 464-471, 2001.*
A. Girgensohn, S. Bly, F. Shipman, J. Boreczky and L. Wilcox, Home Video Editing Made Easy—Balancing Automation and User Control, In Human-Computer Interaction INTERACT '01, IOS Press, pp. 464-471,2001.*

(Continued)

*Primary Examiner* — William C Vaughn, Jr.
*Assistant Examiner* — Heather Jones
(74) *Attorney, Agent, or Firm* — Lyon & Harr, L.L.P.; Craig S. Fischer

(57) ABSTRACT

The present invention relates includes system and a method for automatically generating short segments of video (or video "cliplets") from a larger source video. A cliplet has the properties that its length is determined prior to generation and that the cliplet ideally is semantically meaningful and contains a single short event or theme. Generally, the cliplet generation method processes a large source video and generates cliplet results for presentation (such as to a user). Specifically, the method processes the source video to determine editing points and then extracts cliplets from the source video based on the editing points. The extracted cliplets can overlap in time. Cliplet results then are presented, such as to a user. The cliplet generation system includes a video cliplet generator that processes a large source video and generates cliplets in accordance with the cliplet generation method.

29 Claims, 12 Drawing Sheets

OTHER PUBLICATIONS

Aigrain, P., Zhang, H., and Petkovic, D., *Content-Based Representation and Retrieval of Visual Media: A State-of-the-Art Review*, Kluwer Academic Publishers, Boston, vol. 3, No. 3, 1996, pp. 179-202.

Ren, W, Sharma, M., and Sameer, S., Automated Video Segmentation, In *ICICS 2001*(Singapore), Oct. 31, 2001.

Wang, Y., Liu, Z. and Huang, J-C., Multimedia Content Analysis, In *IEEE Signal Processing* Magazine, New York, Nov. 2000, pp. 12-36.

J. Boreczky, A. Girgensohn, G. Golovchinsky and S. Uchihashi, An Interactive Comic Book Presentation for Exploring Video, In *CHI 2000 Conference Proceedings*, ACM Press, pp. 185-192, 2000.

J. Boreczky and L.D. Wilcox, A Hidden Markov Model Framework for Video Segmentation Using Audio and Image Features, In *Proceedings of the International Conference on Acoustics, Speech and Signal Processing* (Seattle, WA), vol. 6, 1998, pp. 3741-3744.

P. Chiu, A. Girgensohn, W. Polak, E. Rieffel and L. Wilcox, A Genetic Algorithm for Video Segmentation and Summarization, In *Proceedings of ICME (IEEE Multimedia)*, 2000.

A. Girgensohn, S. Bly, F. Shipman, J. Boreczky and L. Wilcox, Home Video Editing Made Easy—Balance Automation and User Control, In *Human-Computer Interaction INTERACT '01*, IOS Press, pp. 464-471, 2001.

A. Girgensohn and J. Boreczky, Time-Constrained Keyframe Selection Technique, In *IEEE Multimedia Systems 1996*, IEEE Computer Society, vol. 1, pp. 756-761, 1999.

A. Girgensohn, J. Boreczky, P. Chiu, J. Doherty, J. Foote, G. Golovchinsky, S. Uchihasi and L. Wilcox, A Semi-Automatic Approach to Home Video Editing, In *UIST 2000 Proceedings*, ACM Press, pp. 81-89.

A. Girgensohn and J. Foote, Video Classification Using Transform Coefficients, In *Proceedings of the International Conference on Acoustics, Speech and Signal Processing* (Phoenix, AZ), vol. 6, pp. 3045-3048, 1999.

A. Hauptmann and M.A. Smith, *Text, Speech, and Vision for Video Segmentation: The Informedia™ Project, AAAI Fall Symposium on Computational Models for Integrating Language and Vision*, Boston, MA, Nov. 10-12, 1995.

H. Jiang, T. Lin and H. Zhang, *Video Segmentation with the Support of Audio Segmentation and Classification*, Microsoft Research, China, 1999.

Z.N. Li and J. Wei, Spatio-Temporal Joint Probability Images for Video Segmentation, In *Proceedings of the IEEE International Conference on Image Processing* (ICIP 2000), vol. II, pp. 295-298, 2000.

E. Sifakis, I. Grinias and G. Tziritas, Video Segmentation Using Fast Marching and Region Growing Algorithms, In *EURASIP Journal on Applied Signal Processing*, 2002:4, pp. 379-388, 2002.

C.M. Taskiran, A. Amir, D. Ponceleon and E.J. Delp, Automated Video Summarization Using Speech Transcripts, In *Proceedings of the SPIE Conference on Storage and Retrieval for Media Databases 2002*, Jan. 20-25, 2002, San Jose, CA.

C.M. Taskiran and E.J. Delp, A Study on the Distribution of Shot Lengths for Video Analysis, In *Proceedings of the SPIE Conference on Storage and Retrieval for Media Databases 2002*, Jan. 20-25, 2002, San Jose, CA.

S. Uchihashi and J. F7oote, Summarizing Video Using a Shot Importance Measure and a Frame-Packing Algorithm, In *Proceedings of the International Conference on Acoustics, Speech and Signal Processing* (Phoenix, AZ), vol. 6, pp. 3041-3044, 1999.

S. Uchihashi, J. Foote, A. Girgensohn and J. Boreczky, Video Magna: Generating Semantically Meaningful Video Summaries, In *Proceedings ACM Multimedia*, (Orlando, FL), ACM Press, pp. 383-392, 1999.

L. Wilcox and J. Boreczky, Annotation and Segmentation for Multimedia Indexing and Retrieval, In *Proceedings of the Thirty-First Annual Hawaii International Conference on System Sciences*, (Wailea, Hawaii), vol. II, pp. 259-267, Jan. 1998.

C. Wills, Video Segmentation for Post-Production, In *Proceedings of the SPIE Conference on Storage and Retrieval for Media Databases 2002*, Jan. 20-25, 2002, San Jose, CA, vol. 4676, pp. 158-167.

Co-pending U.S. Appl. No. 10/177,827, "Computer User Interface for Interacting with Video Cliplets Generated from Digital Video", filed Jun. 19, 2002.

Co-pending U.S. Appl. No. 10/177,460, "System and Method for Automatically Authoring Video Compositions Using Video Cliplets", filed Jun. 19, 2002.

Co-pending U.S. Appl. No. 10/177,882, "Computer User Interface for Viewing Video Compositions Generated from a Video Composition Authoring System Using Video Cliplets", filed Jun. 19, 2002.

Co-pending U.S. Appl. No. 10/176,827, Computer user interface for interacting with video cliplets generated from digital video, filed Jun. 19, 2002.

* cited by examiner

SYSTEM AND METHOD FOR AUTOMATICALLY GENERATING VIDEO CLIPLETS FROM DIGITAL VIDEO

TECHNICAL FIELD

The present invention relates in general to processing of digital video and more particularly to a system and a method for automatically generating short segments of video (or video "cliplets") from digitized video and other digital multimedia.

BACKGROUND OF THE INVENTION

Video cameras (or camcorders) are devices that are popular with amateur videographers for home use. Video cameras may be a digital camera, which stores digital video on a memory device, or an analog video camera, which stores video footage on magnetic videotape. Video footage captured by an analog video camera may be converted into digitized format using well-known techniques. Digital video may be processed using a software running on a computing devices (such as personal computers) to edit and manipulate the data captured by video cameras.

The traditional home digital video paradigm expects a user to shoot good video, perform tedious video editing, and then output a single large video containing the edited movie. This paradigm, however, suffers from several problems. One problem is that good video that is enjoyable to watch is difficult to photograph or shoot. Home digital video is overwhelmingly shot by amateur videographers. These amateurs generally have little training in shooting video and consequently frequently make poor decisions about what and how to shoot video. The result is video footage that is difficult to watch.

Another problem is that raw video footage, even when professionally photographed, is difficult and tedious to edit. Professional editors with professional training and using high-end editing tools can take hour to edit raw video into a final version that is just minutes in duration. Moreover, most raw video footage is boring and poring over hours of raw video is quite a tedious task, especially for an amateur.

Yet another problem is that current video editing software for amateur use is modeled after professional editing systems. This tends to make the software difficult for the average consumer to use. User interfaces of current video editing software typically provide a user with one view of the raw video footage. A timeline is placed along side the footage to give the user temporal orientation. The timeline may include several different "tracks", such as a video 1 track, a video 2 track, an audio 1 track, and so forth. The user interface includes controls similar to a VCR, such as play, fast-forward and rewind buttons. Using these buttons, a user browses the video footage by moving back and forth across the footage using the controls. This process of browsing the video footage is called "scrubbing".

Once a user finds interesting video footage, beginning and ending cuts are placed on the timeline. Between these two cuts is the video footage that the user wants to keep. This process of placing cuts on the video footage may be repeated for other portions of the video footage. This editing process of scrubbing the video to determine the location of cuts in the video footage is a tedious, repetitive and time-consuming task and must be performed manually. Thus, for the average consumer the editing process of video is a difficult and burdensome task.

Another problem is that digitized video is often large and consequently is difficult to manipulate and edit using a computer because of the amount of memory and processing power required. Large videos can take long periods of time to upload and download. In addition, because of their size, editing large videos can tax the resources of even high-end home computers.

Accordingly, there exists a need for a home digital video paradigm that is forgiving of poor video shooting skills, provides less tedious, shorter and easier editing of video, and alleviates the need to work with cumbersome large videos.

SUMMARY OF THE INVENTION

The invention disclosed herein includes a system and a method for automatically generating video cliplets ("cliplets") by dividing up longer units of video (or a source video). A cliplet is an ultra-short segment of digital video. A cliplet has the following features. First, a constraint on the length of the cliplet is determine prior to cliplet generation. Typically, a cliplet is between five and ten seconds in duration. Second, a cliplet is not necessarily an independent video, and could instead be a pointer to a larger video together with indications of segment endpoints. Third, ideally a cliplet is a semantically meaningful portion of a video that can stand alone. In other words, the cliplet contains what a viewer would consider a single short event or theme, such as a sound bite.

The cliplet generation system and method of the invention overcomes the problems of the traditional home video paradigm by casting cliplets—video of very short duration—as the main unit of manipulation, rather than a large source video. Specifically, a home video paradigm using video cliplets alleviates or mitigates nearly all of the current problems with home video. Using the cliplet concept, even amateur videographers can become better photographers and video editors. When the cliplet is the basic unit of video, users begin to think of their videography as shooting cliplets. Shooting with cliplets in mind means that a raw video footage will have denser content, which means more interesting shots. It also means that any editing that occurs will be on short segments of video instead of long, tedious stretches of video.

Cliplets by definition are smaller than regular videos. Because of their smaller size, cliplets are can be manipulated more easily than a large source video on a home computer without taxing the resources of the computer. In addition, the cliplet generation system and method of the invention automatically generates cliplets from a large source video and presents the cliplets to a user. Beginning and ending cuts (or editing points) for the cliplets are automatically generated without the need for the user to perform scrubbing of the source video. This means that a user need only manipulate and edit a source video using cliplets instead of viewing hours of raw video footage. The cliplet generation system and method makes the editing of a large source video quicker, easier and more enjoyable, especially for amateurs.

In general, the cliplet generation method processes a large source video and generates cliplet results for presentation (such as to a user). Specifically, the method takes a source video as input and processes the source video to determine potential editing points. These editing points are points where cuts should be made in the source video and represent a beginning point and an ending point to a particular cliplet. Once the editing points are determined, then cliplets are extracted from the source video based on the editing points. Cliplets can overlap, meaning that an ending point of a first cliplet can be later in the source video than a beginning point of a second cliplet. Cliplets might not cover the entire source video, meaning that there may be gaps between two adjacent cliplets. Cliplet-generation results then are presented. Cliplet-generation results include any one or more of and any combination of a set of video cliplets (as still thumbnails or previewed video), cliplet editing points, video cliplet ratings, and a set of keyframes.

The cliplet generation system includes a video cliplet generator that processes a large source video and generates cliplets in accordance with the above-described cliplet generation method. The video cliplet generator includes two modules for determining the editing points. Each of theses module can be used alone or in combination. First, a sub-shot boundary detector is used to determine editing points based on novel shot- or sub-shot boundaries that can be defined depending on the available technology. Next, a constraint application module is used to determine editing points based on a cliplet duration constraint.

The video cliplet generator also includes a video cliplet extractor that extracts cliplets from the source video using the editing points. A video cliplet rating module may be used to assign "interest ratings" to individual cliplets based on information stored with each cliplet. A keyframe identification module may be used to identify one or more keyframes for an individual cliplet. A keyframe is a video frame that is representative of and summarizes the individual cliplet.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
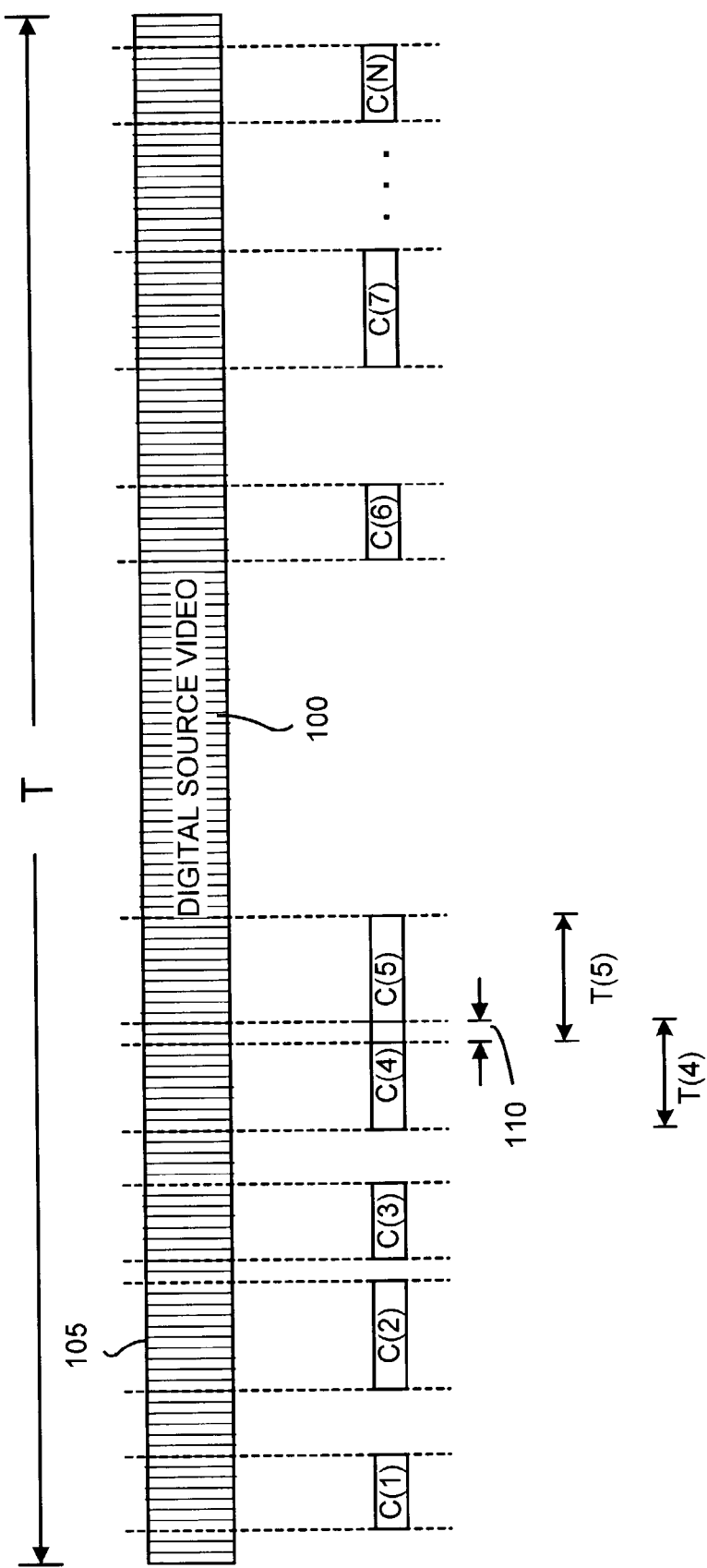
FIG. 1 is a diagram illustrating the concept of the video cliplet in relation to a longer unit of video (a source video) and video frames.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction to Video Cliplets

The cliplet generation system and method described herein processes a source video to generate video cliplets. In general, a video cliplet (or "cliplet") is an ultra-short segment of digital video created by cutting up a large source video. The duration of the cliplet is restricted by a hard or soft constraint that is determined manually by a user or automatically by the cliplet generation system and method. Typically, a video cliplet is expected to be approximately between five and ten seconds in duration, but may be any length in practice.

The goal of cliplet generation is to extract meaningful, short segments of video with only secondary regard for what are traditionally considered shot boundaries. Cliplets, therefore, can be based on other non-traditional cues such as audio cues (such as trying to detect sound bites) or video cues (such as trying to detect zoomed-in close ups). In addition, cliplets can overlap. Cliplets may not cover all of the entire large source video. This means that a really boring and uninteresting section of the source video may be excluded altogether. All of this achieves the goal of having each cliplet be a semantically meaningful portion of video.

The following features distinguish a cliplet from other segments of video. First, prior to generation a duration constraint (i.e., a constraint on the cliplet length) is determined. This constraint may take the form of hard upper and lower bounds, or it may be a soft constraint that takes into account other factors, such as average cliplet length over the entire source video, frequency of sub-shot boundaries, variance in cliplet length, local features of the audio or video, and so forth. Second, a cliplet does not necessary need to be an independent video. The cliplet could be a pair of starting and stopping points denoting where to cut a large source video for extract the cliplet, or any other representation of a subsequence of video. Third, a cliplet is a semantically meaningful portion of video containing what a viewer might consider a single short event (such as a sound bite). The cliplet has a single theme or a common thread that makes the cliplet stand apart from the larger source video.

The relatively short length of a cliplet as compared to the longer source video allows the cliplet to be manipulated more like a digital photograph rather than a digital video. Video cliplets allow a shift from away from large videos that are burdensome to manipulate and store. Cliplets focus on short, exciting segments of video rather than on long, dull videos. Consumers tend to become bored watching hours of a long video that contains only a few interesting scenes. Rather than constantly using the fast-forward button, cliplets allow consumers to extract the interesting scenes, the "heart" of the long video.

Cliplets also are easier than large videos to manipulate and store. User resistance to uploading and sharing videos due to their large size is minimized by generating cliplets from the large video. Cliplets avoid multi-megabyte or multi-gigabyte videos. By definition, cliplets are smaller than large videos. Thus, operations that are impractical on large videos due to limited memory, storage, processing power, bandwidth or human attention can be performed with ease on cliplets. Because of its smaller size, a cliplet has a shorter upload time, makes fewer demands on bandwidth, requires less disk space and generally is easier to manage than large videos.

Most operations that apply to a digital photograph have an analog for video cliplets. Because of its small size, a video cliplet can be browsed using thumbnails, organized by time stamp and gross pixel statistics, cut and pasted into documents, and sent easily over e-mail. In theory, most of these operations already exist for videos but in practice the capabilities are rarely used by consumers because typical home videos are too large, too long and too boring. Image processing and computer vision algorithms that are unable to process large videos can be used easily on cliplets. Technologies such as image stabilization, color correction, panorama creation, three-dimensional depth understanding, face recognition, person tracking can be used on cliplets in real time.

FIG. 1 is a diagram illustrating the concept of the video cliplet in relation to a longer unit of video (a source video) and video frames. A digital source video 100 of length or duration T contains a plurality of video frames 105. As shown in FIG. 1, the digital source video 100 is divided into a plurality of cliplets C(1) to C(N). These cliplets can be of varying lengths.

As explained above, each of these cliplets, C(1) to C(N), is a semantically meaningful portion of the digital source video 100. In some cases, two or more cliplets can overlap in time and thus share the same video frames. Referring to FIG. 1, cliplet C(4) has a length T(4) and cliplet C(5) has a length T(5). Even though T(4) is less than T(5), cliplets C(4) and C(5) overlap in time. In addition, cliplets C(4) and C(5) share the video frames shown by reference numeral 110.

II. System Overview

The present invention includes an automated cliplet generation system and method for creating short clips of video from a larger source video. This entirely automated cliplet generation system and method determines the editing points, extracts cliplets from the source video using the editing points, and presents the cliplets and other cliplet information to the user. Editing points can be determined in a variety of ways, including using duration constraints and sub-shot boundaries.

Figure 2:
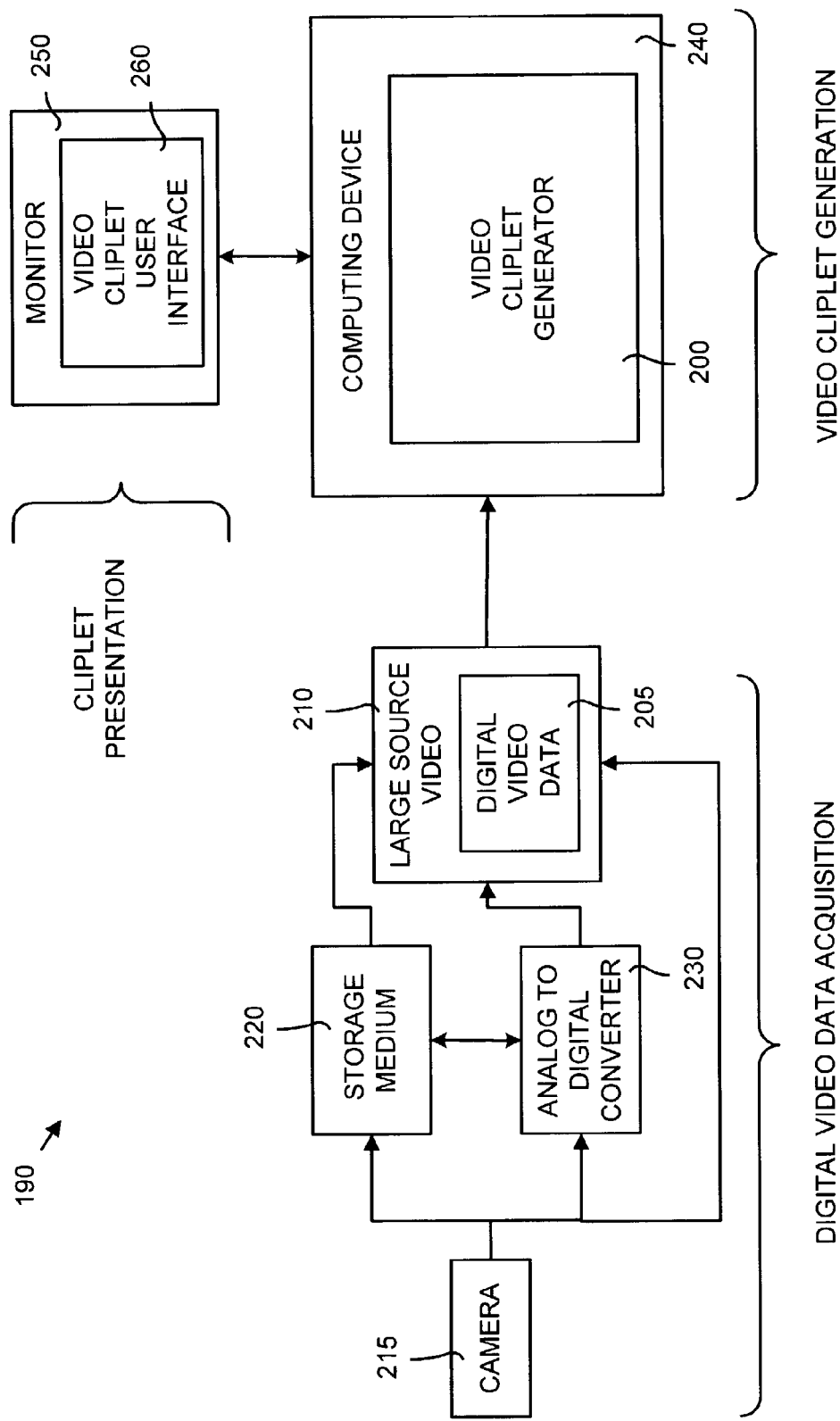
FIG. 2 is a block diagram illustrating an overview of the cliplet generation system of the present invention.

FIG. 2 is a block diagram illustrating an overview of the cliplet generation system 190 of the present invention. In general, as shown in FIG. 2, the system 190 includes a digital video data acquisition component, a video cliplet generation component, and a cliplet presentation component. More specifically, digital video data acquisition concerns how a video cliplet generator 200 obtains digital video data 205. The digital video data 205 is contained in a large source video 210. Initially, a camera 215 is used to capture images of a scene (not shown). The camera 215 may be a digital or an analog video camera or a digital camera capable of capturing video data. If the camera 215 is a digital camera, captured video data is either stored in a storage medium 220 or sent directly to the video cliplet generator 200. If the camera 215 is an analog camera, the captured video data must be converted to digital form using an analog-to-digital converter 230. As before, this converted data may either be stored on the storage medium or sent directly to the video cliplet generator 200.

Once acquired, the large source video 210 containing the digital video data 205 is sent to the video cliplet generator 200. Typically, the large source video 210 is approximately a two-hour long home video captured by an amateur videographer. The video cliplet generator 200, which is located on a computing device 240, is used to extract small segments of video or cliplets from the large source video 210. After the cliplets are generated by the video cliplet generator 200, then a monitor 250 containing a video cliplet user interface 260 is used to present each cliplet to a user (not shown). The video cliplet user interface 260 allows the user to manipulate and manage the cliplets.

III. Exemplary Operating Environment and System Details

The video cliplet generation system 190 of the present invention is designed to operate in a computing environment. The follow discussion is intended to provide a brief, general description of a suitable computing environment in which the invention may be implemented.

Figure 3:
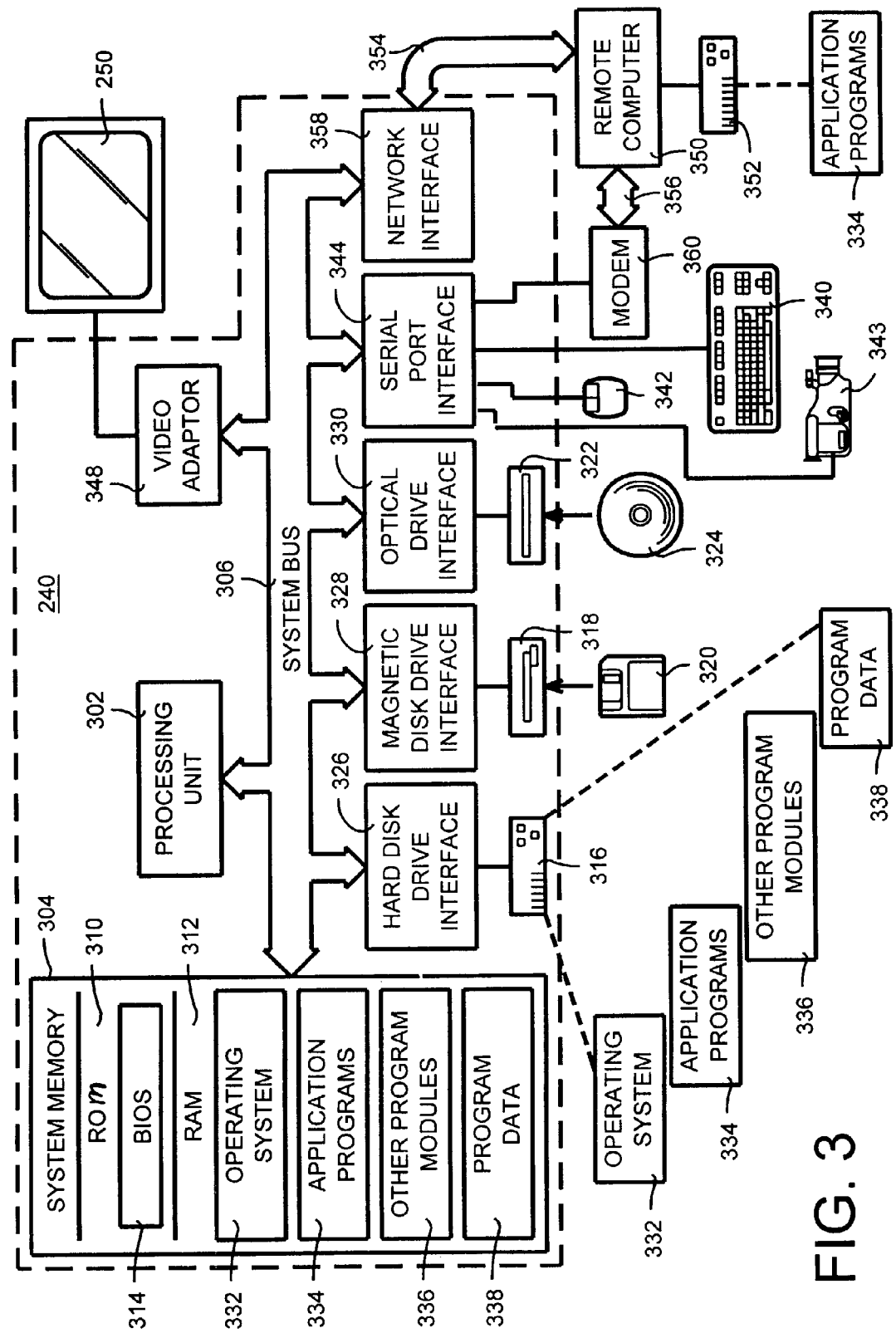
FIG. 3 is a block diagram illustrating a computing apparatus suitable for carrying out the invention.

FIG. 3 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 3, an exemplary system for implementing the invention includes a general-purpose computing device 240 shown in FIG. 2. FIG. 3 illustrates details of the computing device 240. In particular, the computing device 240 includes the processing unit 302, a system memory 304, and a system bus 306 that couples various system components including the system memory 304 to the processing unit 302. The system bus 306 may be any of several types of bus structures including a memory bus or memory controller, a peripheral bus, and a local bus using any of a variety of bus architectures. The system memory includes read only memory (ROM) 310 and random access memory (RAM) 312. A basic input/output system (BIOS) 314, containing the basic routines that help to transfer information between elements within the computing device 240, such as during start-up, is stored in ROM 310. The computing device 240 further includes a hard disk drive 316 for reading from and writing to a hard disk, not shown, a magnetic disk drive 318 for reading from or writing to a removable magnetic disk 320, and an optical disk drive 322 for reading from or writing to a removable optical disk 324 such as a CD-ROM or other optical media. The hard disk drive 316, magnetic disk drive 328 and optical disk drive 322 are connected to the system bus 306 by a hard disk drive interface 326, a magnetic disk drive interface 328 and an optical disk drive interface 330, respectively. The drives and their associated computer-readable media provide nonvolatile storage of computer readable instructions, data structures, program modules and other data for the computing device 240.

Although the exemplary environment described herein employs a hard disk, a removable magnetic disk 320 and a removable optical disk 324, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 320, optical disk 324, ROM 310 or RAM 312, including an operating system 332, one or more application programs 334, other program modules 336 (such as the video cliplet generator 200) and program data 338. A user (not shown) may enter commands and information into the computing device 240 through input devices such as a keyboard 340 and a pointing device 342. In addition, a camera 343 (such as a video camera) may be connected to the computing device 240 as well as other input devices (not shown) including, for example, a microphone, joystick, game pad, satellite dish, scanner, or the like. These other input devices are often connected to the processing unit 302 through a serial port interface 344 that is coupled to the system bus 306, but may be connected by other interfaces, such as a parallel port, a game port or a universal serial bus (USB). The monitor 250 (or other type of display device) is also connected to the system bus 306 via an interface, such as a video adapter 348. In addition to the monitor 346, computing devices such as personal computers typically include other peripheral output devices (not shown), such as speakers and printers.

The computing device 240 may operate in a networked environment using logical connections to one or more remote computers, such as a remote computer 350. The remote computer 350 may be another personal computer, a server, a router, a network PC, a peer device or other common network node, and typically includes many or all of the elements described above relative to the computing device 240, although only a memory storage device 352 has been illustrated in FIG. 3. The logical connections depicted in FIG. 3 include a local area network (LAN) 354 and a wide area network (WAN) 356. Such networking environments are commonplace in offices, enterprise-wide computer networks, intranets and the Internet.

When used in a LAN networking environment, the computing device 240 is connected to the local network 354 through a network interface or adapter 358. When used in a WAN networking environment, the computing device 240 typically includes a modem 360 or other means for establishing communications over the wide area network 356, such as the Internet. The modem 360, which may be internal or external, is connected to the system bus 306 via the serial port interface 344. In a networked environment, program modules depicted relative to the computing device 240, or portions thereof, may be stored in the remote memory storage device 352. It will be appreciated that the network connections shown are exemplary and other means of establishing a communications link between the computers may be used.

Figure 4:
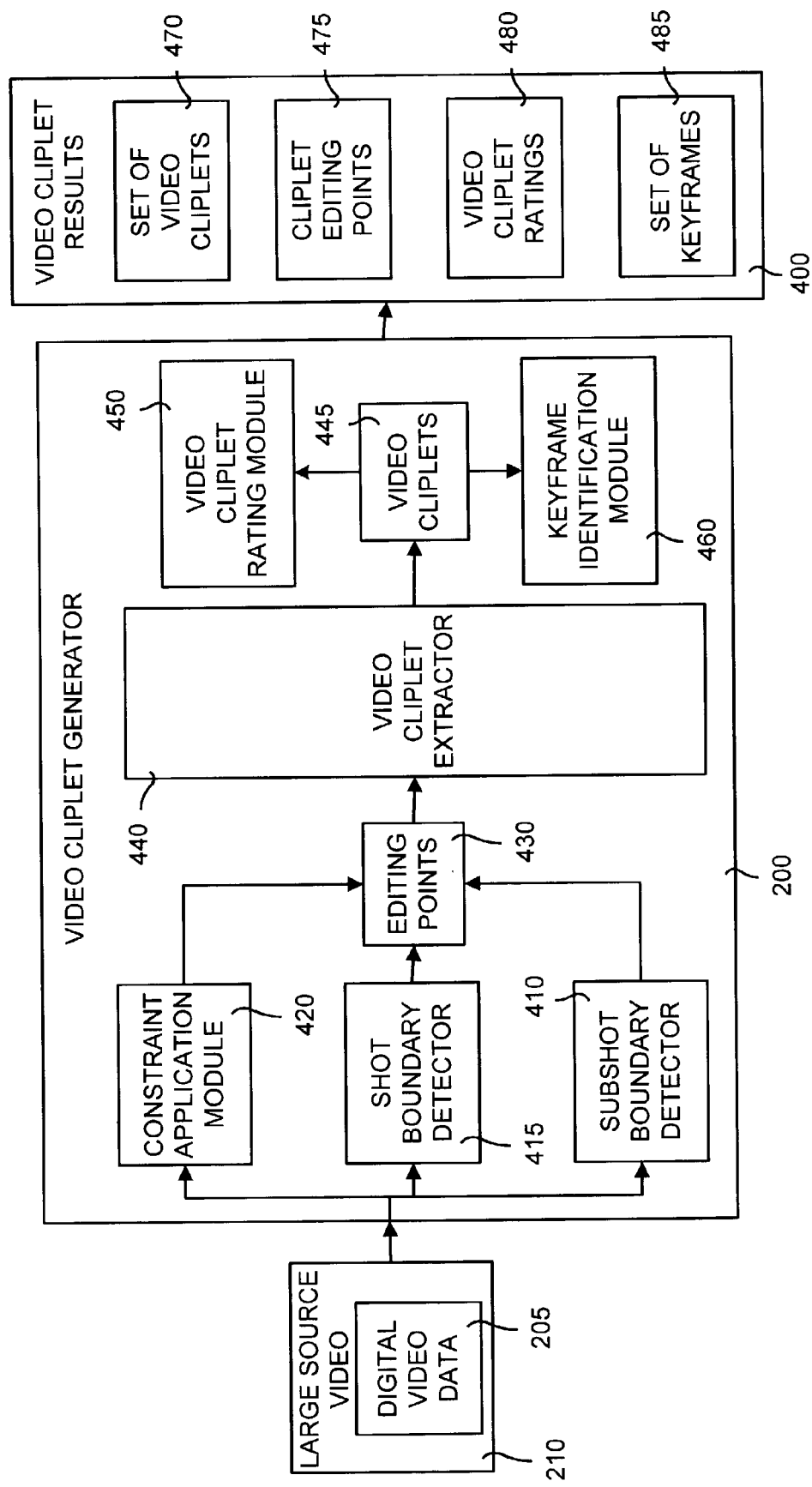
FIG. 4 is a detailed block diagram illustrating the details of the video cliplet generator shown in FIG. 2.

The video cliplet generation system 190 includes the video cliplet generator 200 for generating cliplets and other cliplet information. FIG. 4 is a detailed block diagram illustrating the details of the video cliplet generator 200 shown in FIG. 2. In general, the video cliplet generator 200 inputs the large source video 210 containing digital video data 205 and outputs cliplet information in the form of video cliplet results 400. The video cliplets results may contain a variety of information relating to cliplets that can be presented to a user for manipulation and use by the user.

The video cliplet generator 200 includes at least two modules to determine editing points: (1) a sub-shot boundary module 410 (an example of which is a shot boundary module 415; and (2) a constraint application module 420. The output for each of these modules 410, 415, 420 are editing points 430. The editing points 430 are cutting points or locations in the large source video 210 where a cliplet should be extracted. Each of the modules 410, 415, 420 may be used alone or in any combination to determine the editing points 430.

The sub-shot boundary detector 410 determines editing points 430 by finding sub-shots within the source video 210. Sub-shots are defined as semantic boundaries that define a specific event or theme. Sub-shot boundaries are not necessarily shot boundaries (see below), but they may be shot boundaries. For example, if a person is talking on the video, the pause between sentences may be a good place to define a sub-shot boundary, even though it is not a shot boundary. The sub-shot boundary detector 410 looks for places in the source video 210 where events or themes can be semantically separated, even within a single shot.

The shot boundary detector 415 determines the editing points 430 by processing the source video 210 to find shot boundaries—shot boundaries compose a subset of all of the sub-shot boundaries that may be detected by a particular cliplet generating system. A shot boundary is defined as the locations in the source video 210 where the camera has been turned "on" or "off". The portion of video between these camera "on" and camera "off" locations within the source video 210 is defined as a shot.

The constraint application module 420 determines the editing points 430 using a cliplet duration constraint. The cliplet duration constraint might indicate the minimum and maximum duration of a cliplet. Usually, the cliplet duration constraint is approximately between five and ten seconds, although other durations may be used. The cliplet duration constraint can be a "soft" constraint, meaning that if other constraints or editing point indicia are used, the cliplet duration constraint yields and allows the length of the cliplet to be arbitrarily long or short.

The constraint application module 420 takes the large source video 210 and divides the source video 210 into cliplets whose length adheres to the value of the cliplet duration constraint, while trying to cut cliplets at points where sub-shot boundaries have been detected. Appropriate measures are taken so that the complete set of generated cliplets satisfies the duration constraint. For example, if the constraint is a hard constraint that no cliplet be longer than 10 seconds, then a 36-second video, with sub-shots detected on the second, might generate 4 segments of video, (of 8, 7, 10, and 11 seconds length, or 4 overlapping segments of 10 seconds, etc.).

Once the editing points 430 have been determined, a video cliplet extractor 440 cuts cliplets from the source video 210 based on the editing points 430. Video cliplets 445 then are sent as output from the video cliplet extractor 440. Note that the cutting process may require no physical cutting at all, since the editing points together with a pointer to the source video 210 themselves represent a cliplet.

The video cliplet generator 200 also includes a video cliplet ratings module 450 for generating an "interest rating" for each cliplet in the video cliplets 445. These ratings are computed per cliplet instead of per frame. The advantage of assigning ratings per cliplet is that each cliplet may be presented to a user based on these ratings. Because cliplets contain several frames, presenting all the cliplets and their ratings is a much more manageable task than presenting all frames and their ratings. In addition, a cliplet contains much more information than a frame, so presenting the most popular cliplets to a user allows the user to obtain much more information about the source video 210 that merely presenting the most popular frames.

A keyframe identification module 460 is included in the video cliplet generator 200 for determining a keyframe for a cliplet contained in the video cliplets 445. A keyframe is identified using criteria such that the keyframe best represents the selected criteria as applied to the cliplet. There may be any number of keyframes per cliplet, although at least one keyframe is preferred.

The output of the video cliplet generator 200 are video cliplet results 400. These results 400 can include information generated by each of the modules contained in the video cliplet generator 200. As shown in FIG. 4, the video cliplet results 400 may include a set of video cliplets 470, obtained by the video cliplet extractor 440, and cliplet editing points 475 obtained one or more of the constraint application module 410, the shot boundary detector 415, and the sub-shot boundary detector 410. Moreover, the video cliplet results 400 also may include video cliplet ratings 480, obtained by the video cliplet rating module 450, and a set of keyframes 485, obtained by the keyframe identification module 460. The video cliplet results 400 may includes any combination of this cliplet information.

IV. Operational Overview and Details

Figure 5:
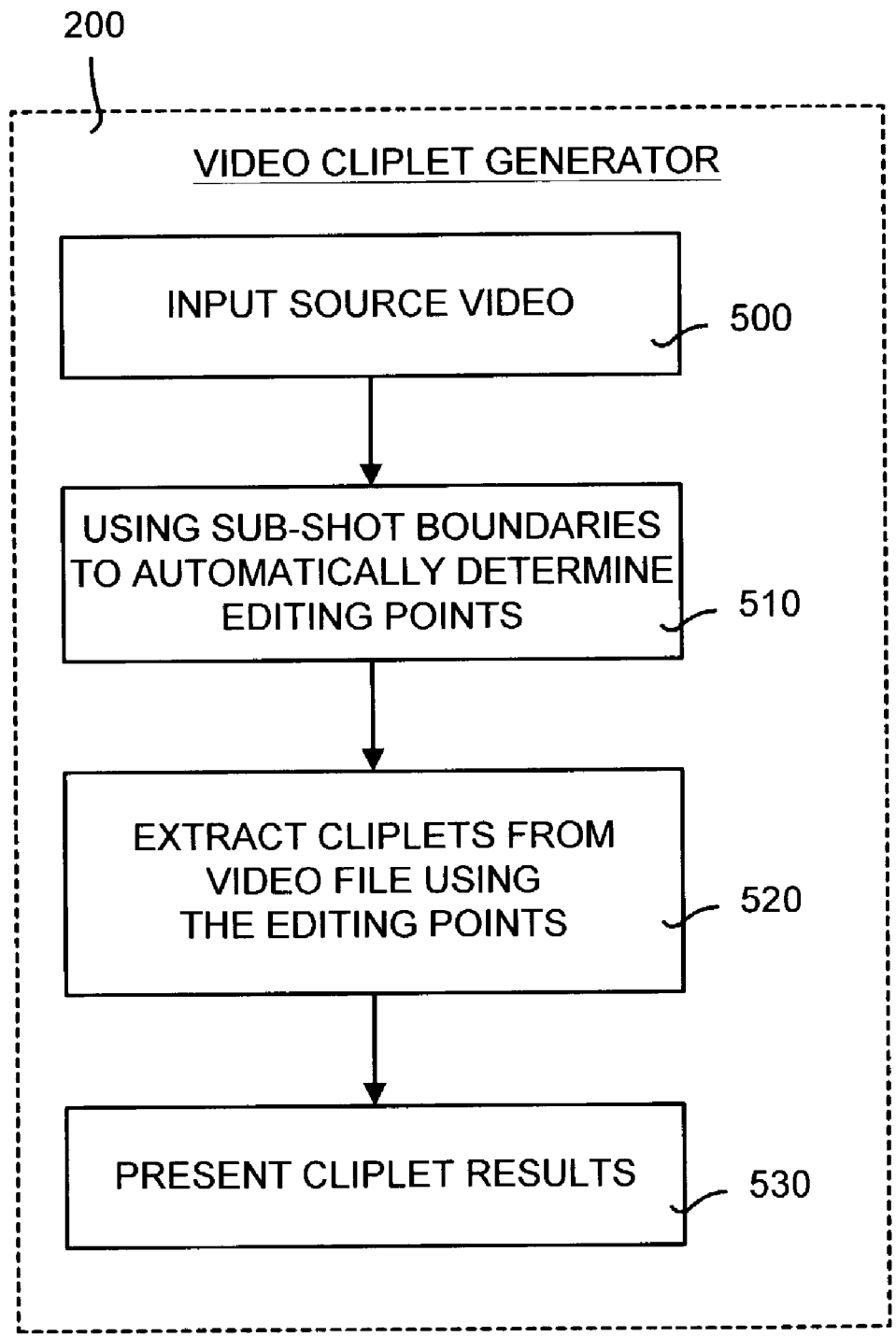
FIG. 5 is a general flow diagram illustrating the operation of the video cliplet generator shown in FIGS. 2 and 4.

FIG. 5 is a general flow diagram illustrating the operation of the video cliplet generator 200 shown in FIGS. 2 and 4. In general, the video cliplet generator 200 processes a large source video to generate cliplets and cliplet information for presentation. Specifically, the video cliplet generator 200 first inputs the source video 210 for processing (box 500). Next, editing points 430 are automatically determined using sub-shot boundaries (box 510) and possibly one or more of the techniques discussed in detail below. Using the editing points 430, cliplets are extracted from the source video 210 (box 520). Finally, the cliplet results 400 are presented, such as to a user for manipulation.

Sub-Shot Boundary Detector

Figure 6:
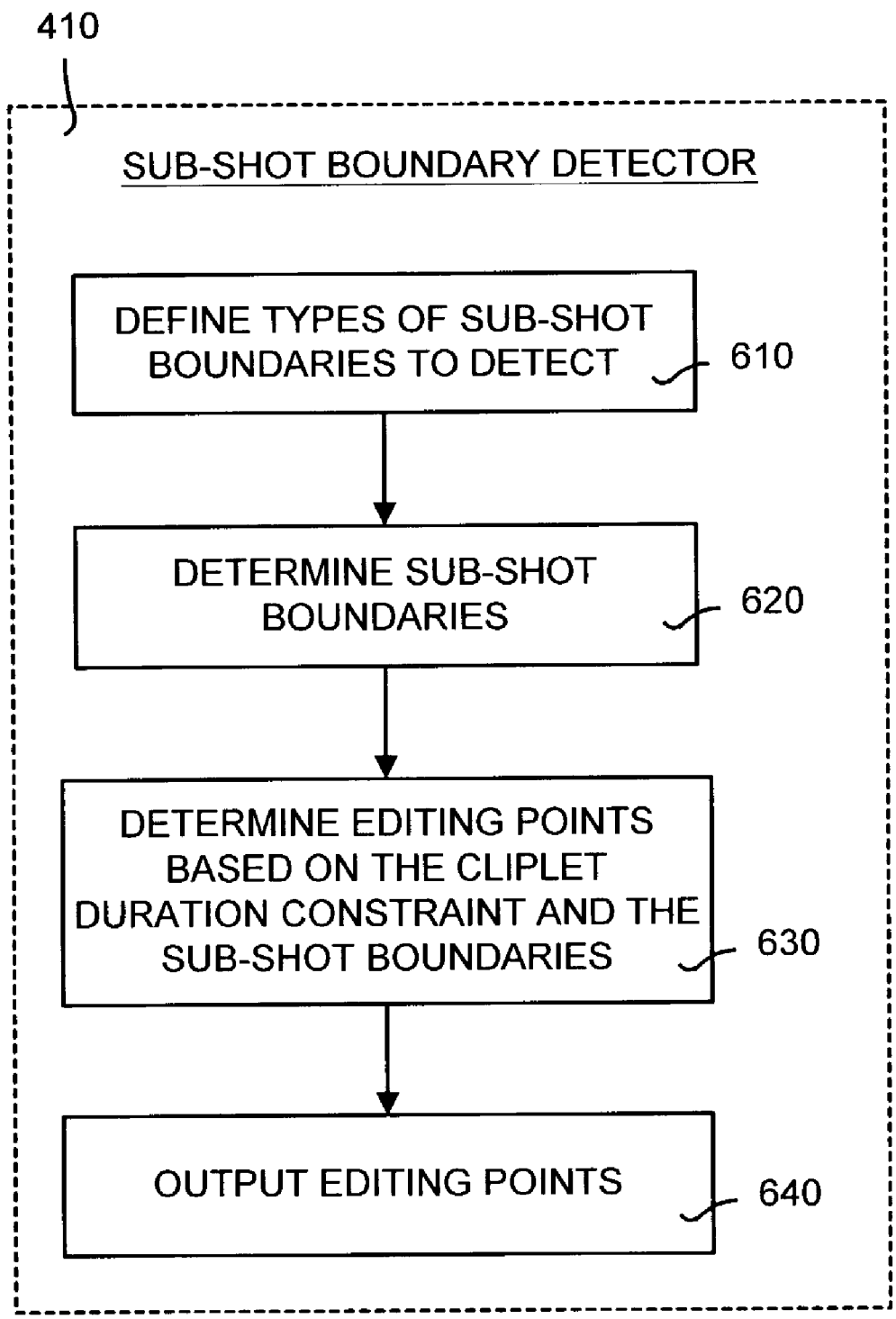
FIG. 6 is a detailed flow diagram illustrating the operational details of the sub-shot boundary detector shown in FIG. 4.

FIG. 6 is a detailed flow diagram illustrating the operational details of the sub-shot boundary detector 410 shown in FIG. 4. In general, the sub-shot boundary detector 410 uses sub-shot boundaries to define the editing points 430. The sub-shot boundary detection method is used to find the editing points 430 corresponding to those parts of the source video 210 that provide convenient points for cutting video and creating cliplets.

First, the types of sub-shot boundaries to detect are defined (box 610). A sub-shot boundary may be defined using any type of criteria that semantically makes sense. For example, types of sub-shot boundaries include the following. Traditional shot boundaries are a type of sub-shot boundary. Any moment between speech utterances can be a sub-shot boundary. Panning may be used as a sub-shot boundary criteria, such that the beginning, middle or end of a pan (instead of at a steady point in the video) is used as a sub-shot boundary. Similarly, zoom may be used as a sub-shot boundary criteria, such that the point immediately following a zoom is used as a sub-shot boundary. Using a zoom criteria is based on the knowledge that a videographer will usually zoom in on an interesting subject or event. Scene clustering may be used as a sub-shot boundary criteria so that various scenes that are similar to each other are clustered together such that the similar scenes belong to the same sub-shot. In addition, time stamp-based shot detection, video-based shot detection, audio-based shot detection, and audio-visual based shot detection may be used as criteria for sub-shot boundary detection. Further, audio analysis using any available features in the audio signal portion of the source video 210 may be used to define sub-shot boundaries. These audio features include audio spectrum analysis, speech recognition, and audio power variance decomposition. Video analysis using any available features in the video signal of the source video 210 may be used to define sub-shot boundaries. These video features include color histograms, wavelet decomposition, optic flow parameters, Fourier transform coefficients, and face detection, to name a few.

Once the types of sub-shot boundaries are defined, the sub-shot boundaries are determined (box 620). Next, the editing points 430 are determined based on the cliplet duration constraint and the sub-shot boundaries (box 630). Finally, the editing points 430 are sent as output from the sub-shot boundary detector 410 (box 640). It should be noted that sub-shot boundaries occur in at least one of the following locations: (a) scene changes; (b) object entrance; (c) object exit; (d) other discrete changes in a fitted model.

One example of finding sub-shot boundaries based on visual cues is to compute the Bhattacharya distance between the color histograms of adjacent video frames. It is assumed that peaks in the distance above a certain threshold are sub-shot boundaries. An alternative is to use "generative models of video" to model the source video 210 being processed and to define sub-shot boundaries when the background changes substantially. In addition, the sub-shot boundaries could be defined as the points when a certain visual element enters or exits the video. For example, sub-shot boundaries could be defined when a person enters or exits the scene. One example of finding sub-shot boundaries based on audio cues is to find valleys in the audio power signal that are longer than a fixed duration to determine moments of silence. The midpoints of the valleys could be defined as sub-shot boundaries. One example of finding a sub-shot boundaries without reference to any type of data is to create sub-shot boundaries every N seconds, where N may be a short duration such as the cliplet duration constraint. Any one or combination of the above-mentioned criteria could be used to defined sub-boundaries.

It should be noted that each editing point generated by sub-shot boundary detection will not necessarily be used to generate cliplets. This is because a sub-shot boundary is simply a candidate for cutting, not a definite editing point; thus, a resulting cliplet may itself contain many sub-shot boundaries. For example, a sub-shot boundary may be found every 0.5 seconds and the cliplet duration constraint may be 7 seconds. In this case, not every sub-shot boundary would be used because there are sub-shot boundaries too frequently.

Figure 7:
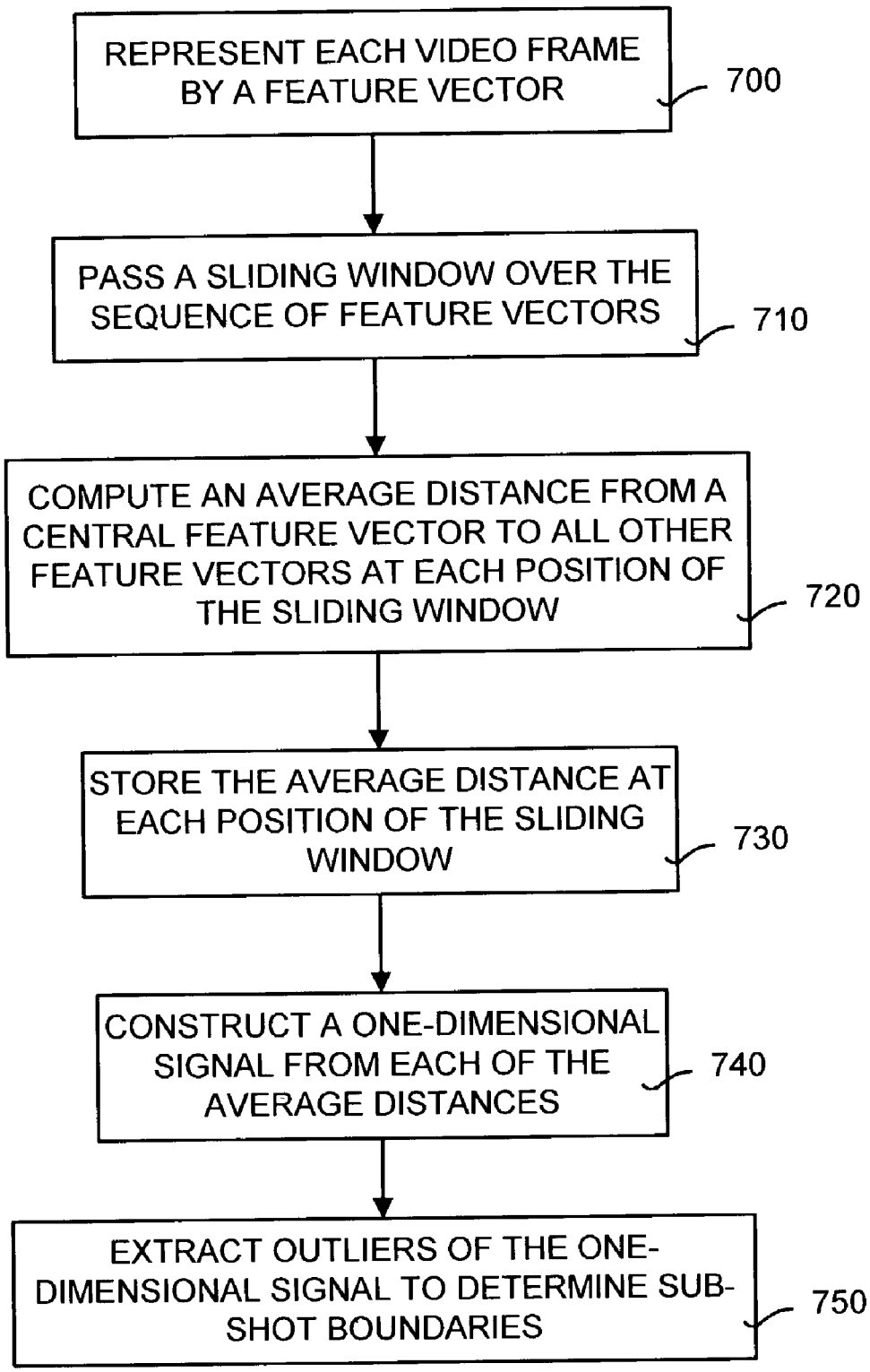
FIG. 7 is a detailed flow diagram illustrating a working example of the subshot detector using a feature-based approach.

FIG. 7 is a detailed flow diagram illustrating a working example of the sub-shot detector 420 using a feature-based approach. Using a feature-based approach means that each video frame in the source video 210 was parsimoniously represented by a feature vector (box 700). In this working example, the feature vector was a low-dimensional feature vector. The feature vectors are used throughout the sub-shot boundary detection process without any reference to the original video frames. Although the specific features may vary, the features used in this example were the average image luminance and the color histograms for each quarter of a video frame.

The sub-shot boundary detection was performed by passing a sliding window over the sequence of feature vectors (box 710). At each position of the sliding window, the average distance from a central feature to all other feature vectors in the window was computed (box 720) and were stored (box 730). This resulted in a one-dimensional signal that was constructed from each of the stored average distances (box 740). Next, the outliers of the one-dimensional signal were extracted (box 750). The outliers of the one-dimensional signal correspond to sub-shot boundaries. The extraction was performed using a robust statistical outlier detection procedure.

Figure 8:
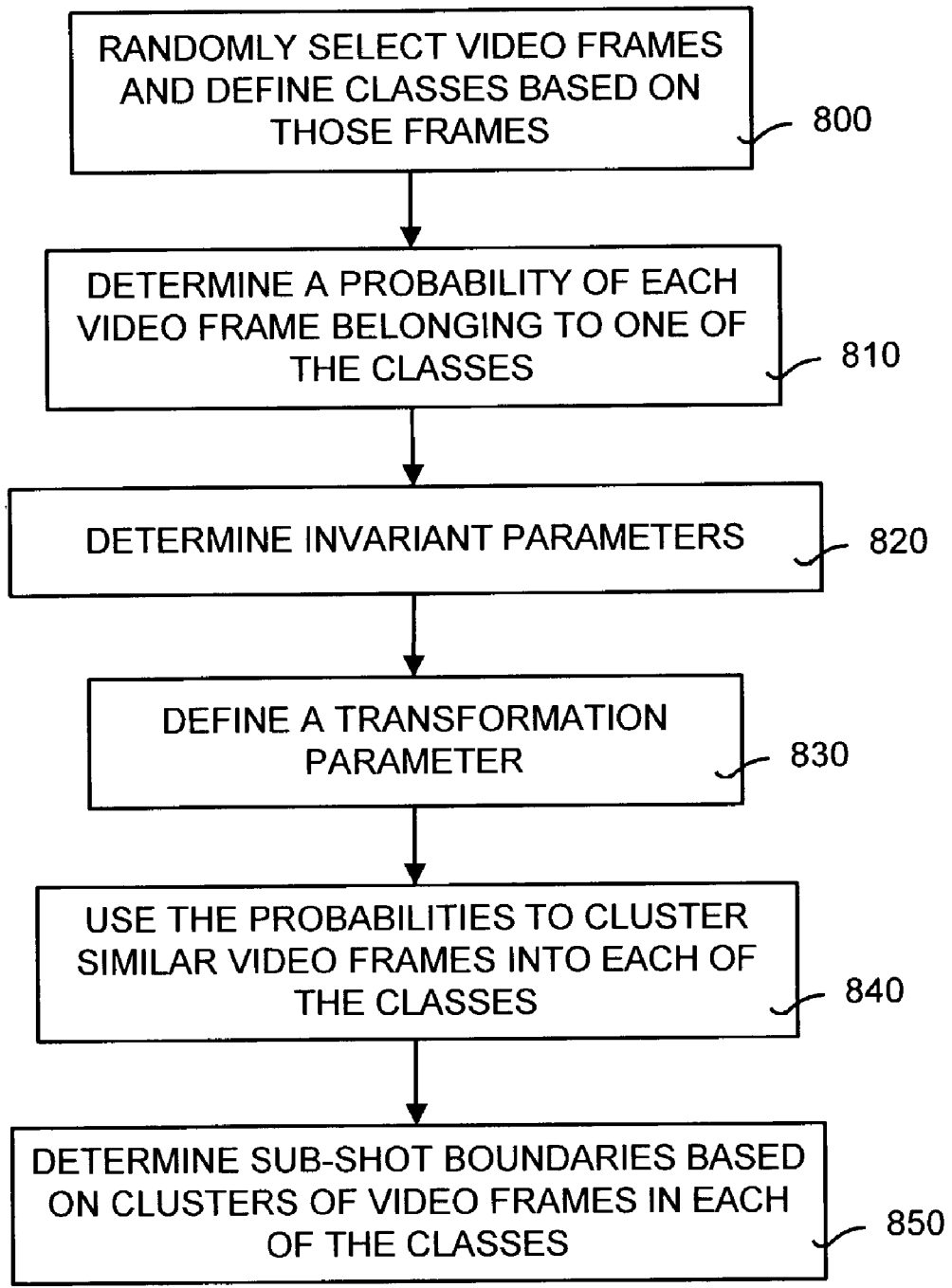
FIG. 8 is a detailed flow diagram illustrating a working example the subshot boundary detection using scene clustering.

FIG. 8 is a detailed flow diagram illustrating a working example the sub-shot boundary detection using scene clustering. The scene clustering is used to define and detect sub-shot boundaries and using these boundaries to generate cliplets. Scene clustering may be performed using video, audio, or both. The general idea is that similar data (whether visual or audio data) is clustered, and clusters of similar data are used to define classes. Each frame in the source video 210 is assigned to a class, and sub-shot boundaries occur where there is a change in class between frames.

The scene clustering method begins knowing neither the classes nor the class definitions (such as in terms of means and variances). Random guesses are made and through an iterative process the video frames begins clustering and aligning themselves into classes. Eventually, the video frames are grouped into separate classes and a mean image for the class becomes apparent.

As shown in FIG. 8, in this working example the scene clustering method begins by randomly selecting video frames from the source video 210 and defining classes based on these frames (box 800). Next, for each video frame a probability that the video frame belongs to each of the classes was determined (box 810). The observed data then was averaged and weighted by the probabilities, which made the video frames merge into separate, distinct classes. In addition, invariant parameters were determined (box 820) and a transformation parameter was defined (box 830). The transformation parameter is a random variable that transforms the video frame so that video frames that are similar but slightly transformed still belong to the same class. For example, if a set of video frames contain a person and the next set of video frames contains a close up of that same person, a zoom transformation parameter could be defined such that both sets of video frames belong to the same class regardless of the zoom. This is known as zoom invariant.

Typically, the data is clustered in a transformation invariant manner. This means that video frames that have similar content but are different because of shifting (such as left, right, up or down) or zoomed in or out are considered the same and clustered together in the same class. Alternatively, some transformation parameters can be selected as not invariant and used to determine scene clustering. In particular, if zoom is selected as an invariant zoom parameter, then sub-shot boundaries are not defined at zooming points. But if zoom is not an invariant transformation parameter, then a sub-shot boundary can be defined for a zooming point, such as after a zoom-in point on the source video 210.

The probabilities then were used to cluster similar video frames into each of the classes (box 840). This was done using an iterative process so that through each iteration each video frames separated into distinct and separate classes. Finally, sub-shot boundaries were determined based on the clustering of the video frames into each of the classes (box 850).

The scene clustering technique described above takes into account the spatial grouping of pixels with a video frame, and not just the color or intensity of the pixels. This give the scene clustering technique advantages over other techniques when determining sub-shot boundaries. For example, the scene clustering technique is much less sensitive to changes in intensity than pixel intensity techniques. This means that, unlike pixel intensity techniques, the scene clustering technique will not find a sub-shot boundary simply because of intensity changes between video frames. Moreover, the scene clustering technique is more reliable than pixel color techniques because color is a weak cue.

Shot Boundary Detector

Figure 9:
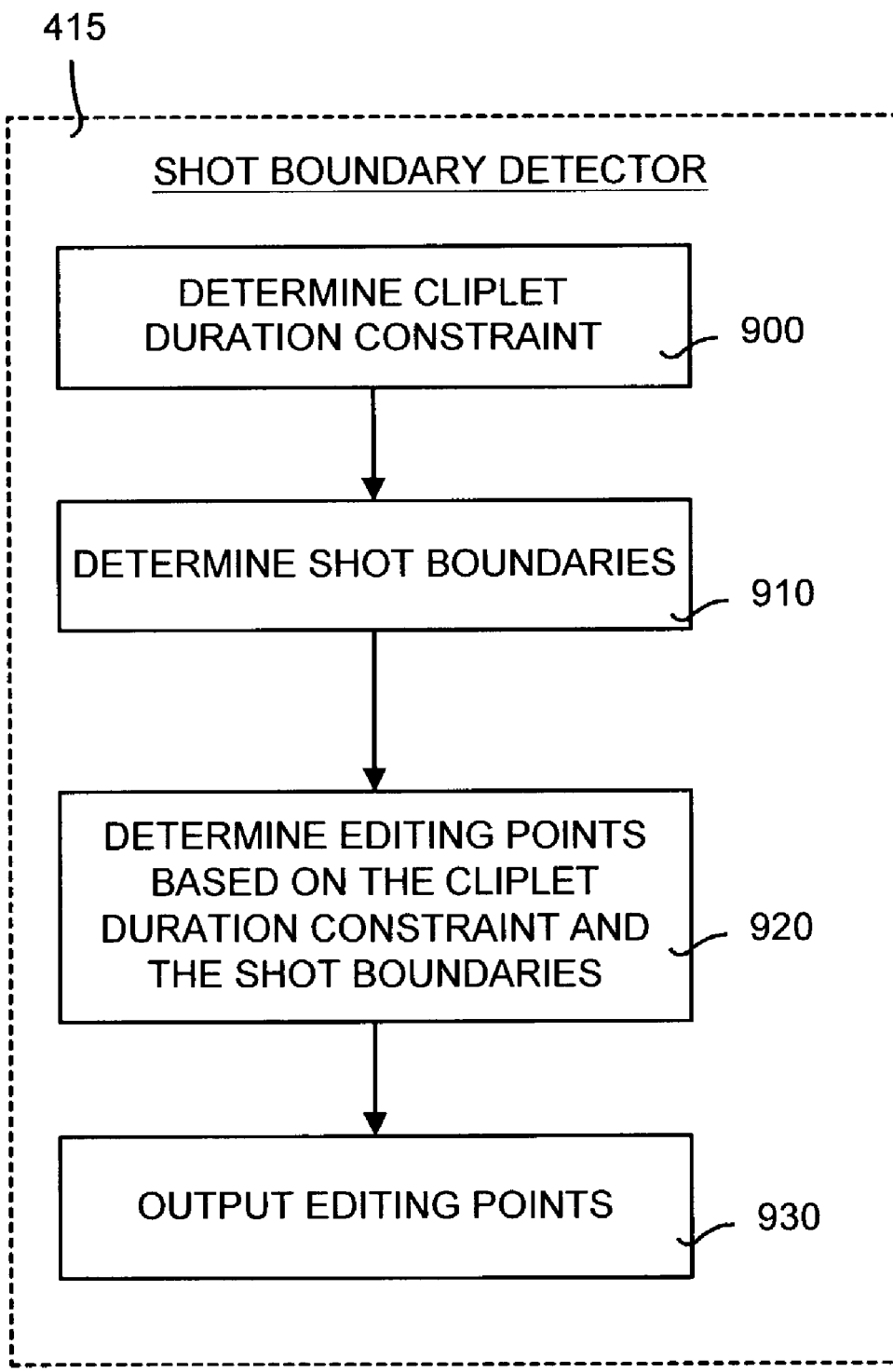
FIG. 9 is a detailed flow diagram illustrating the operational details of the shot boundary detector shown in FIG. 4.

FIG. 9 is a detailed flow diagram illustrating the operational details of the shot boundary detector 415 shown in FIG. 4. The shot boundary detector is an example, or typically one of the many components, of a sub-shot boundary detector. Generally, the shot boundary detector 415 finds the editing points 430 using discontinuities in the video time stamp, or in sudden discontinuities in the video image between adjacent frames. More specifically, the shot boundary detector 415 first determines the cliplet duration constraint (box 900) in the manner described above. Next, shot boundaries are determined (box 910). As discussed above, shot boundaries are those locations in the source video 210 where the camera has been turned "on" or "off". The portion of video between these camera "on" and camera "off" locations within the source video 210 is defined as a shot.

Constraint Application Module

Figure 10:
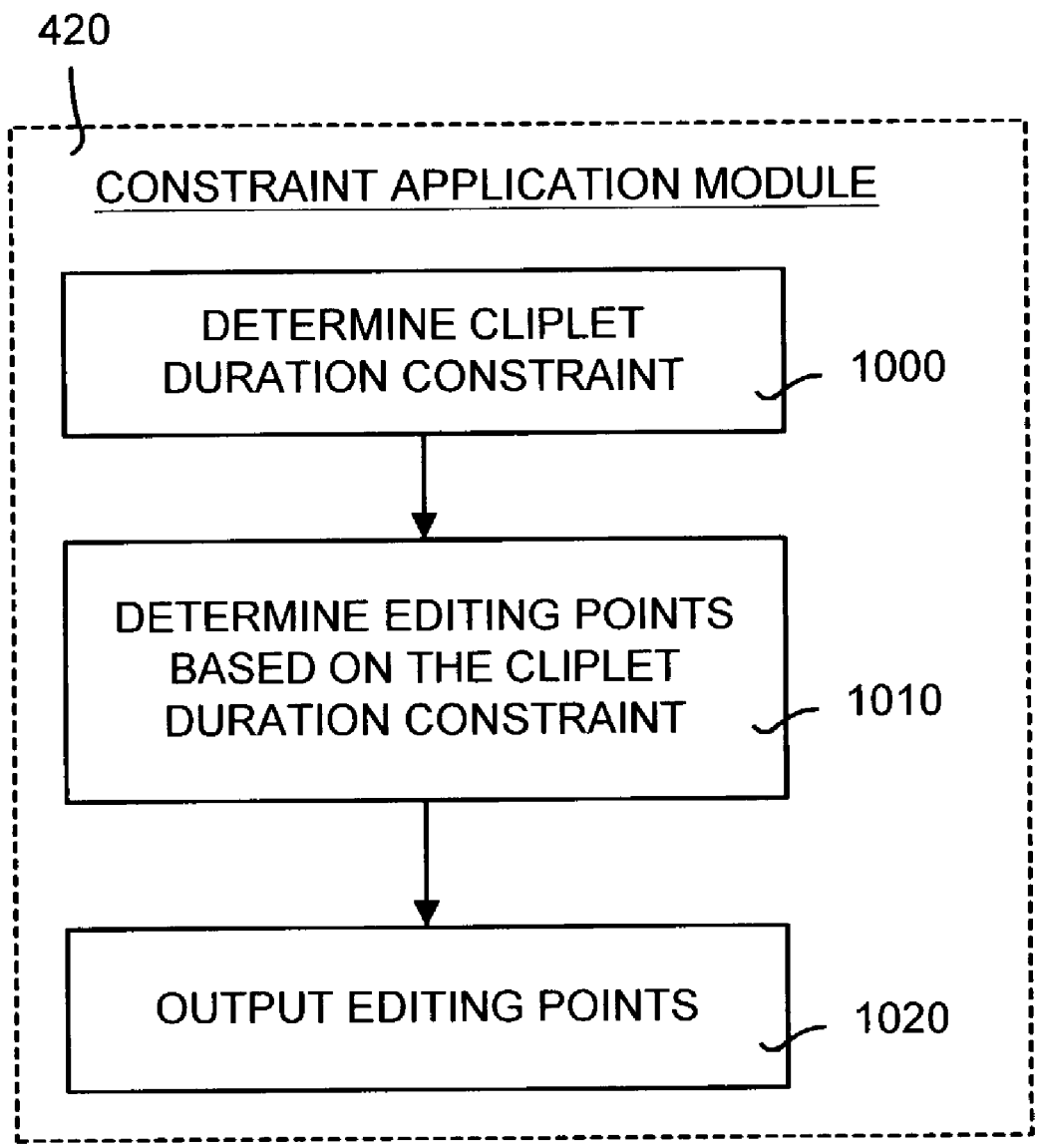
FIG. 10 is a detailed flow diagram illustrating the operational details of the constraint application module shown in FIG. 4.

FIG. 10 is a detailed flow diagram illustrating the operational details of the constraint application module 420 shown in FIG. 4. In general, the constraint application module 420 is used to find the editing points 430 to generate cliplets from the source video 210. In particular, a cliplet duration constraint is determined (box 1000). This constraints may be determined in a variety of ways, including being selected by a user, being pre-selected, or being determined on the fly by the constraint application module 420. As discussed above, the cliplet duration constraint can be any "hard" or "soft" constraint on the duration of a cliplet. In the event that no convenient sub-shot boundaries exist, the constraint application module may arbitrarily make a cut, based on the duration constraint alone. Next, the editing points 430 are determined based on the cliplet duration constraint (box 1010). These editing points 430 then are sent as output from the constraint application module 420 (box 1020).

Video Cliplet Rating Module

Cliplets may have interest ratings assigned to them based upon processing technologies that are available to provide information about the cliplet. For example, if face detection technology is available, then each individual cliplet can be processed to detect faces. The information obtained from this processing, such as whether the cliplet contains a face, is then stored with each individual cliplet. Based on this information an interest rating in face detection then can be determined for each cliplet. The interest ratings are associated per cliplet, rather than per video frame. Computation of the features used in the rating process, however, may have been performed per frame, and stored for later use during the cliplet rating process.

Figure 11:
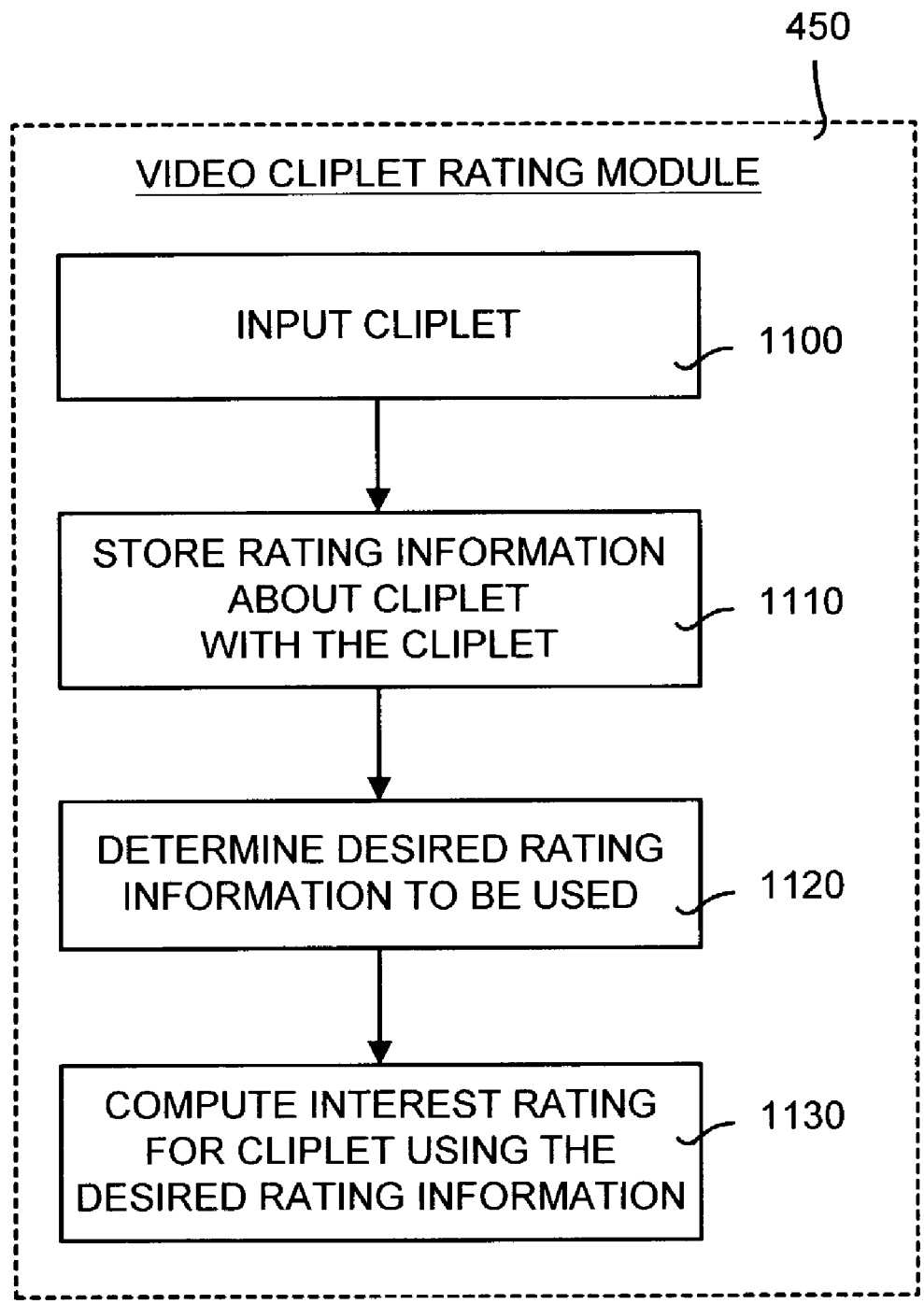
FIG. 11 is a detailed flow diagram illustrating the operational details of the video cliplet rating module shown in FIG. 4.

FIG. 11 is a detailed flow diagram illustrating the operational details of the video cliplet rating module 450 shown in FIG. 4. This is an optional process, but if desired the video cliplet rating module 450 assigns cliplet ratings to individual cliplets. As shown in FIG. 11, the video cliplet rating module 450 begins by inputting a cliplet (box 1100). Next, rating information about the cliplet is stored with the cliplet (box 1110). The desired rating information to be used then is determined (box 1120). The desired rating information means which of the rating information stored with the cliplet is to be used when assigning cliplet ratings. Finally, the video cliplet rating module 450 computes an interest rating for the cliplet using the desired rating information (box 1130). Preferably, the interest rating for each cliplet is normalized over all of the cliplets. For example, a cliplet having the highest interest rating in face detection would be normalized to a value equal to one, and all other interest ratings in face detection for other cliplets would be one or less.

Cliplet ratings can be based on any information relevant to and available for a cliplet. This cliplet rating information includes time stamps, location stamps, audio signal, video signal and all of the information and analyses as discussed above concerning sub-shot boundary detection. Cliplet rating information can take advantage of whatever technology is available to provide information about a cliplet. This includes voice recognition, speaker recognition, face detection, zoom detection, pan detection, any type of audio analyses or recognition, and any type of video analyses or recognition. Any of these technologies may be used to generate an interest rating for an individual cliplet. By way of example, is the interest rating is in detecting faces, then cliplets containing faces would have a higher interest rating than those cliplet without faces, and among cliplets with faces, those which contain faces facing the camera for a greater percentage of the time may be rated higher. As another example, if the interest rating is in close-ups, then cliplets that immediately follow a zooming event would have a higher interest rating than other cliplets.

Cliplet interest ratings may be multi-dimensional. For example, a cliplet may have a rating for "audio activity level" as well as separate ratings for "visual activity level" and "occurrence of faces". Ratings may be absolute numeric values or may be relative orderings (or rankings) between cliplets. The video cliplet rating module 450 can compute ratings for cliplets individually or for a set of all possible cliplets.

By way of example, assume that a rating is to be assigned to a cliplet based on audio. This can be performed by computing a variance in an audio power signal, normalized over all known cliplets. In another example of cliplet rating using vision, assume that camera zoom or pan is detected and higher ratings are assigned to cliplets immediately following a zoom or pan event. In yet another example of cliplet rating using duration is to make a rating proportional to a Gaussian centered on durations of x seconds, where x might be based on user preferences or expectations.

Keyframe Identification Module

At least one keyframe can be identified for each cliplet. A keyframe is a representative video frame of a cliplet that best summarizes the content of the cliplet. There may be any number of keyframes per cliplet, although at least one keyframe is preferred.

Figure 12:
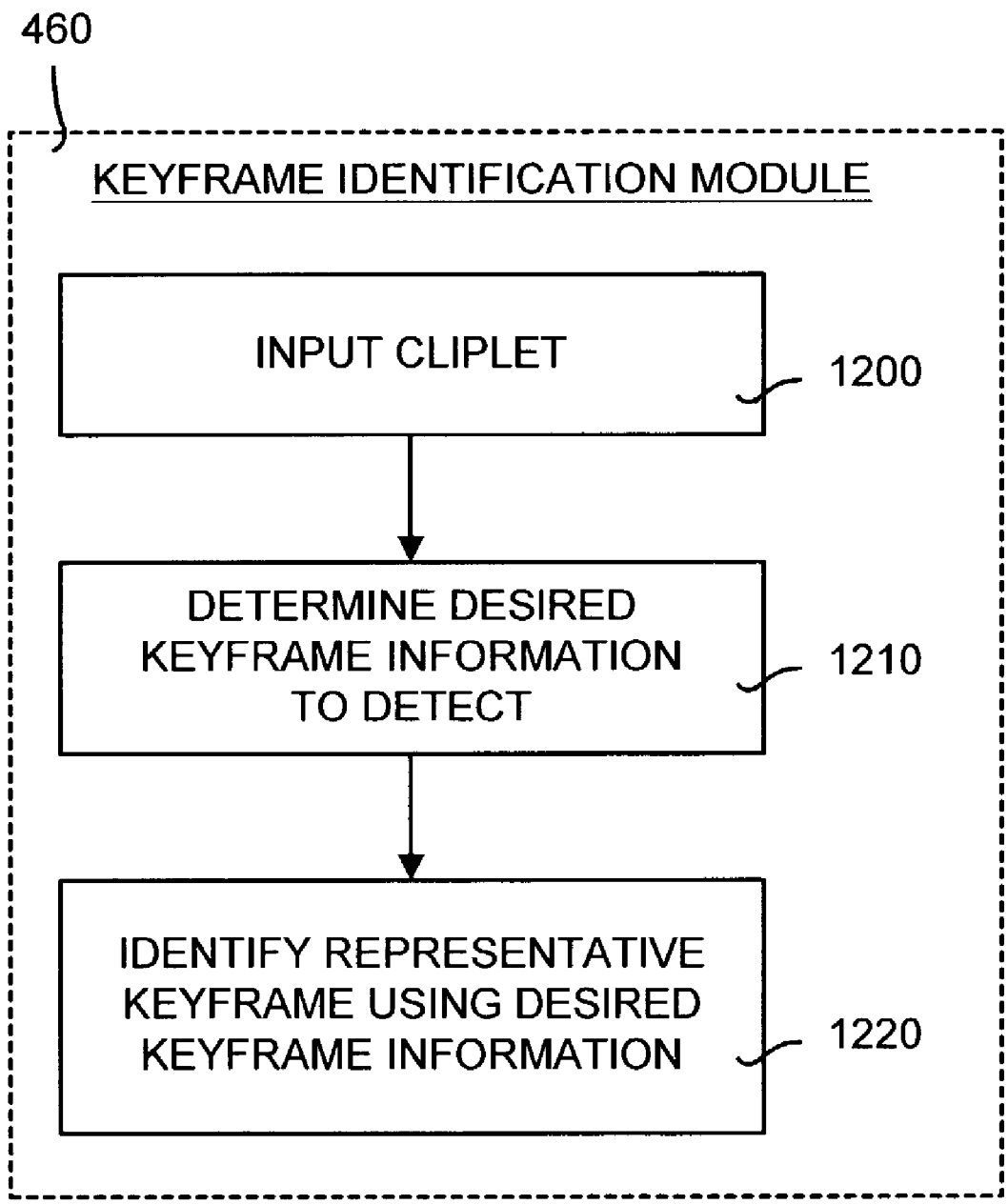
FIG. 12 is a detailed flow diagram illustrating the operational details of the keyframe identification module 460 shown in FIG. 4.

FIG. 12 is a detailed flow diagram illustrating the operational details of the keyframe identification module 460 shown in FIG. 4. Initially, the keyframe identification module 460 receives a cliplet as input (box 1200). The desired keyframe information to detect is then determined (box 1210). Lastly, an representative keyframe is identified using the desired keyframe information (box 1220).

The information used to detect a keyframe can be information obtained from any of the processing techniques described above, such as audio analyses and recognition and video analyses and recognition. Alternatively, a keyframe may be detected without reference to information contained within the cliplet. For example, keyframes may be identified for each individual cliplet by detecting the middle video frame of a cliplet and defining that middle video frame as the keyframe. Another example of keyframe identification is to sample every $m^{th}$ video frame of the cliplet and define those sampled video frames as keyframes. Yet another example of keyframe identification is to run a Viterbi algorithm on the Bhattacharya distance on color histograms of video frames in the cliplet. The location of peaks in the computer log-likelihood are defined as keyframes for the cliplet.

The goal of identifying keyframes is to extract the most representative video frames from an individual cliplet in order to summarize that cliplet. To achieve this goal, the keyframes identified should be maximally dissimilar and have a high utility value. A frame distance metric and a frame utility measure are defined. The frame distance metric measures the similarity between two video frames contained in the cliplet. The frame distance metric is zero for identical video frames and increase in value for an increase in frame dissimilarity. The frame utility measure reflects the goodness of a video frame as a keyframe. Typically, video frames that are brighter (meaning higher average luminance) and are more colorful (meaning higher entropy on color histograms) are preferred as keyframes. In a preferred approach to keyframe identification, keyframes are identified by a dynamic programming (or Viterbi) procedure maximizes a cost function. The cost function encapsulates the desired criteria or desired keyframe information to detect. In addition, an optimal number of keyframes for each cliplet is automatically determined using the Bayes Information Criterion (BIC).

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for automatically processing a source video, comprising:
using a computing device having a processor to perform the following:
clustering video frames in the source video in a transformation invariant manner by determining a probability that a video frame is similar to another video frame, the clustering further comprising:
finding video frames that have similar content but are different because of shifting left, right, up or down and because of a different level of zoom;
clustering together the video frames having similar content but a different level of zoom so that the clustering takes into account a spatial grouping of pixels within a video frame and not a color or an intensity of the pixels to generate a plurality of clusters such that each of the plurality of clusters contains video frames having similar data;
defining a class as clusters of similar data and assigning each video frame in the source video to a class;
defining sub-shot boundaries as occurring where there is a change in class between video frames;
defining a small segment of the source video as a cliplet;
determining a cliplet duration constraint that defines a hard constraint of a minimum and a maximum temporal length of the cliplet;
determining editing points of the source video for every cliplet using both the cliplet duration constraint and the sub-shot boundaries such that the minimum and maximum temporal length and the sub-shot boundaries are used when determining where to place the editing points;
if no sub-shot boundaries can be found, then determining the editing points using the maximum temporal length of the cliplet alone;
using the editing points to designate a beginning point and an ending point of the cliplet; and
presenting the cliplet results to a user.

2. The method as set forth in claim 1, further comprising:
using scene clustering based on generative models of video to determine sub-shot boundaries;
wherein sub-shot boundaries occur in at least one of the following locations: (a) scene changes; (b) object entrance; (c) object exit; (d) other discrete changes in a fitted model.

3. The method as set forth in claim 1, further comprising:
using scene clustering based on generative models of audio to determine sub-shot boundaries;
wherein sub-shot boundaries occur in at least one of the following locations: (a) between speech utterances; (b) between different sound types; (c) other discrete changes in a fitted model.

4. The method as set forth in claim 1, further comprising:
using scene clustering based on generative models of audio and video combined;
wherein sub-shot boundaries occur at discrete changes in a fitted model.

5. The method as set forth in claim 1, further comprising using valley detection in an audio signal of the source video to determine moments of silence between sounds or speech utterances as a way to determine sub-shot boundaries.

6. The method as set forth in claim 1, further comprising using peaks in the Bhattacharya distance between color histograms of adjacent frames of the source video to determine sub-shot boundaries.

7. The method as set forth in claim 1, wherein determining sub-shot boundaries further comprises:
representing each video frame of the source video by a feature vector;
computing an average distance using the feature vector;
constructing a one-dimensional signal from the average distance; and
using the one-dimensional signal to determine the sub-shot boundaries.

8. The method as set forth in claim 1, wherein the cliplet duration constraint is manually selected.

9. The method as set forth in claim 1, wherein using sub-shot boundaries to automatically determine the editing points further comprises automatically choosing the types of sub-shot boundaries to use.

10. The method as set forth in claim 1, further comprising outputting editing points in the form of frame "anchors" or signatures rather than time stamps, wherein the frame anchors computationally specify a unique moment in the source video.

11. The method as set forth in claim 1, wherein extracting the cliplet includes creating a shortened copy of the source video between by the cliplet endpoints.

12. The method as set forth in claim 1, wherein extracting the cliplet involves storing endpoints of the cliplet.

13. The method as set forth in claim 1, further comprising computing and storing an interest rating for each cliplet.

14. The method as set forth in claim 1, further comprising identifying a keyframe for a cliplet using desired keyframe information.

15. The method as set forth in claim 1, wherein cliplet results include at least one of: (a) the cliplet; (b) the editing points.

16. A method for automatically processing a video containing video frames, comprising:
using a computing device having a processor to perform the following:
determining a cliplet duration constraint that defines a hard constraint of a minimum and a maximum temporal length of a cliplet, which is a small segment of the video;
automatically using scene clustering to determine editing points of the video using the cliplet duration constraint, the scene clustering further comprising:
randomly selecting video frames from the video and defining clusters based on these selected video frames;
determining for each video frame in the video a probability that the video frame belongs to one of the defined clusters;
clustering video frames in the video in a transformation invariant manner using the probability, the clustering further comprising:
finding video frames that have similar content but are different because of shifting left, right, up or down and because of a different level of zoom;
clustering together the video frames having similar content but a different level of zoom so that the clustering takes into account a spatial grouping of pixels within a video frame and not a color or an intensity of the pixels to generate a plurality of clusters such that each of the plurality of clusters contains video frames having similar data;
defining a class as clusters of similar data and assigning each video frame in the video to a class;
defining sub-shot boundaries as occurring where there is a change in class between video frames;
determining editing points of the video for every cliplet using both the cliplet duration constraint and the sub-shot boundaries such that the minimum and maximum temporal length and the sub-shot boundaries are used when determining where to place the editing points;
if no sub-shot boundaries can be found, then determining the editing points using the maximum temporal length of the cliplet alone;
using the editing points to designate a beginning point and an ending point of the cliplet;
computing a cliplet interest rating for the cliplet;
extracting a cliplet from the video using the editing points; and
presenting the cliplet and cliplet interest rating.

17. The method as set forth in claim 16, wherein automatically determining editing points using the cliplet duration constraint occurs without referring to any detected subshot boundaries.

18. The method as set forth in claim 16, wherein the cliplet interest rating is determined for audio interest by computing a normalized variance of the audio signal power during a cliplet.

19. A method for automatically cutting a large source video containing video frames into a plurality of smaller segments, comprising:
using a computing device having a processor to perform the following:
automatically using scene clustering to determine editing points corresponding to a beginning point and an ending point for each of the plurality of smaller segments, each of the plurality of smaller segments being called a cliplet, the scene clustering further comprising:
randomly selecting video frames from the large source video and defining clusters based on these selected video frames;
determining for each video frame in the large source video a probability that the video frame belongs to one of the defined clusters;
clustering video frames in the large source video in a transformation invariant manner using the probability, the clustering further comprising:
finding video frames that have similar content but are different because of shifting left, right, up or down and because of a different level of zoom;

clustering together the video frames having similar content but a different level of zoom so that the clustering takes into account a spatial grouping of pixels within a video frame and not a color or an intensity of the pixels to generate a plurality of clusters such that each of the plurality of clusters contains video frames having similar data;

defining a class as clusters of similar data and assigning each video frame in the source video to a class;

defining sub-shot boundaries as occurring where there is a change in class between video frames;

determining a cliplet duration constraint that defines a hard constraint of a minimum and a maximum temporal length of the cliplet;

determining editing points of the source video for every cliplet using both the cliplet duration constraint and the sub-shot boundaries such that the minimum and maximum temporal length and the sub-shot boundaries are used when determining where to place the editing points;

if no sub-shot boundaries can be found, then determining the editing points using the maximum temporal length of the cliplet alone;

extracting the cliplets from the large source video based on the editing points;

wherein at least two of the cliplets overlap and share at least one of the video frames.

20. The method as set forth in claim 19, wherein determining sub-shot boundaries further comprises:

representing each video frame by a feature vector;

computing an average distance using the feature vector;

constructing a one-dimensional signal from the average distance; and using the one-dimensional signal to determine the sub-shot boundaries.

21. The method as set forth in claim 20, further comprising passing a sliding window over a sequence of the feature vectors and computing the average distance by measuring the distance from a central feature vector to all other feature vectors at each position of the sliding window.

22. The method as set forth in claim 20, further comprising extracting outliers of the one-dimensional signal to determine sub-shot boundaries.

23. A computer-readable storage device having stored and encoded thereon computer-executable instructions for automatically editing a digitized video, comprising:

using scene clustering to determine editing points in an automatic manner using a sub-shot boundary, the scene clustering further comprising:

randomly selecting video frames from the digitized video and defining clusters based on these selected video frames;

determining for each video frame in the digitized video a probability that the video frame belongs to one of the defined clusters;

clustering video frames in the digitized video in a transformation invariant manner using the probability, the clustering further comprising:

finding video frames that have similar content but are different because of shifting left, right, up or down and because of a different level of zoom;

clustering together the video frames having similar content but a different level of zoom so that the clustering takes into account a spatial grouping of pixels within a video frame and not a color or an intensity of the pixels to generate a plurality of clusters such that each of the plurality of clusters contains video frames having similar data;

defining a class as clusters of similar data and assigning each video frame in the source video to a class;

defining sub-shot boundaries as occurring where there is a change in class between video frames;

defining segments of the digitized video as a cliplet;

determining a cliplet duration constraint that defines a hard constraint of a minimum and a maximum temporal length of the cliplet;

determining editing points of the source video for every cliplet using both the cliplet duration constraint and the sub-shot boundaries such that the minimum and maximum temporal length and the sub-shot boundaries are used when determining where to place the editing points;

if no sub-shot boundaries can be found, then determining the editing points using the maximum temporal length of the cliplet alone;

using the editing points to determine a beginning point and an ending point for the cliplet; and displaying cliplet results, where the cliplet results include at least one of the following: (a) the cliplet; (b) the editing points.

24. The computer-readable storage device as set forth in claim 23, further comprising defining the types of sub-shot boundaries to detect.

25. The computer-readable storage device as set forth in claim 23, further comprising determining the sub-shot boundary using scene clustering based on generative models of at least one of the following: (a) audio; (b) video.

26. A video cliplet generation system for processing a source video, comprising:

a video cliplet generator for automatically generating a cliplet from the source video and a cliplet rating for the cliplet, the video cliplet generator further comprising a sub-shot boundary detector for using scene clustering to determine editing points based on sub-shot boundaries, the scene clustering further comprising:

randomly selecting video frames from the source video and defining clusters based on these selected video frames;

determining for each video frame in the source video a probability that the video frame belongs to one of the defined clusters;

clustering video frames in the source video in a transformation invariant manner using the probability, the clustering further comprising:

finding video frames that have similar content but are different because of shifting left, right, up or down and because of a different level of zoom;

clustering together the video frames having similar content but a different level of zoom so that the clustering takes into account a spatial grouping of pixels within a video frame and not a color or an intensity of the pixels to generate a plurality of clusters such that each of the plurality of clusters contains video frames having similar data;

defining a class as clusters of similar data and assigning each video frame in the source video to a class;

defining the sub-shot boundaries as occurring where there is a change in class between video frames;

determining a cliplet duration constraint that defines a hard constraint of a minimum and a maximum temporal length of the cliplet;

determining editing points of the source video for every cliplet using both the cliplet duration constraint and the sub-shot boundaries such that the minimum and maximum temporal length and the sub-shot boundaries are used when determining where to place the editing points;

if no sub-shot boundaries can be found, then determining the editing points using the maximum temporal length of the cliplet alone;

using the editing points to designate a beginning point and an ending point of the cliplet; and a video cliplet user interface in communication with the video cliplet generator for displaying and presenting cliplet results including the cliplet and the cliplet ratings.

27. The video cliplet generation system as set forth in claim 26, wherein the video cliplet generator further includes a constraint application module for determining editing points based on the cliplet duration constraint and the sub-shot boundaries.

28. An automated digital video system for processing a digitized video containing video frames, comprising:

a video cliplet generator, comprising:

a sub-shot boundary detector for using scene clustering to determine editing points, the scene clustering further comprising:

randomly selecting video frames from the digitized video and defining clusters based on these selected video frames;

determining for each video frame in the digitized video a probability that the video frame belongs to one of the defined clusters;

clustering each of the video frames in the digitized video in a transformation invariant manner using the probability, the clustering further comprising:

finding video frames that have similar content but are different because of shifting left, right, up or down and because of a different level of zoom;

clustering together the video frames having similar content but a different level of zoom so that the clustering takes into account a spatial grouping of pixels within a video frame and not a color or an intensity of the pixels to generate a plurality of clusters such that each of the plurality of clusters contains video frames having similar data;

defining a class as clusters of similar data and assigning each video frame in the source video to a class;

defining sub-shot boundaries as occurring where there is a change in class between video frames;

a video cliplet extractor that extracts segments of the digitized video, hereinafter referred to as cliplets;

a cliplet duration constraint that defines a hard constraint of a minimum and a maximum temporal length of the cliplets;

editing points of the source video that are determined for every cliplet using both the cliplet duration constraint and the sub-shot boundaries such that the minimum and maximum temporal length and the sub-shot boundaries are used when determining where to place the editing points, and if no sub-shot boundaries can be found, then determining the editing points using the maximum temporal length of the cliplet alone, and using the editing points to designate a beginning point and an ending point of the cliplet;

a video cliplet rating module that determines interest ratings for each individual cliplet based on information stored with the cliplet; and a set of video cliplet results including at least one of: (a) a set of cliplets; (b) the editing points; (c) the video cliplet interest ratings.

29. The automated digital video system as set forth in claim 28, wherein the video cliplet generator further comprises a keyframe identification module for identifying which video frames in the cliplet represent and summarize the cliplet.

* * * * *